Feb. 21, 1928. 1,659,817
H. B. HALVORSEN
VALVE MECHANISM
Filed Jan. 30, 1922
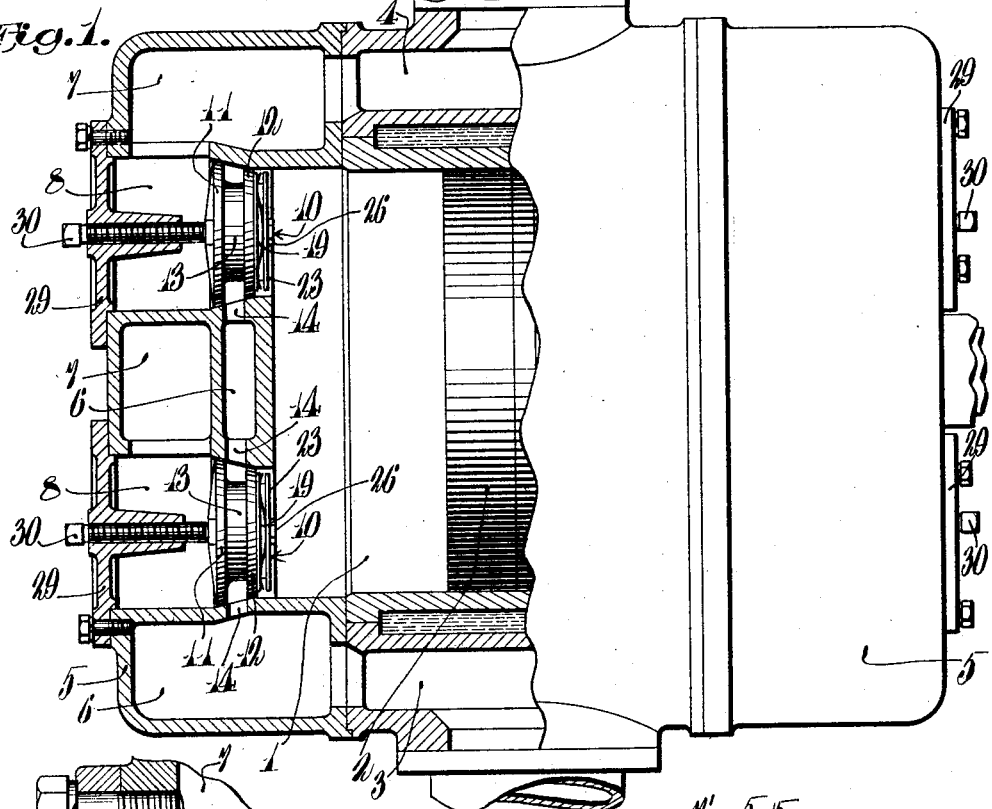
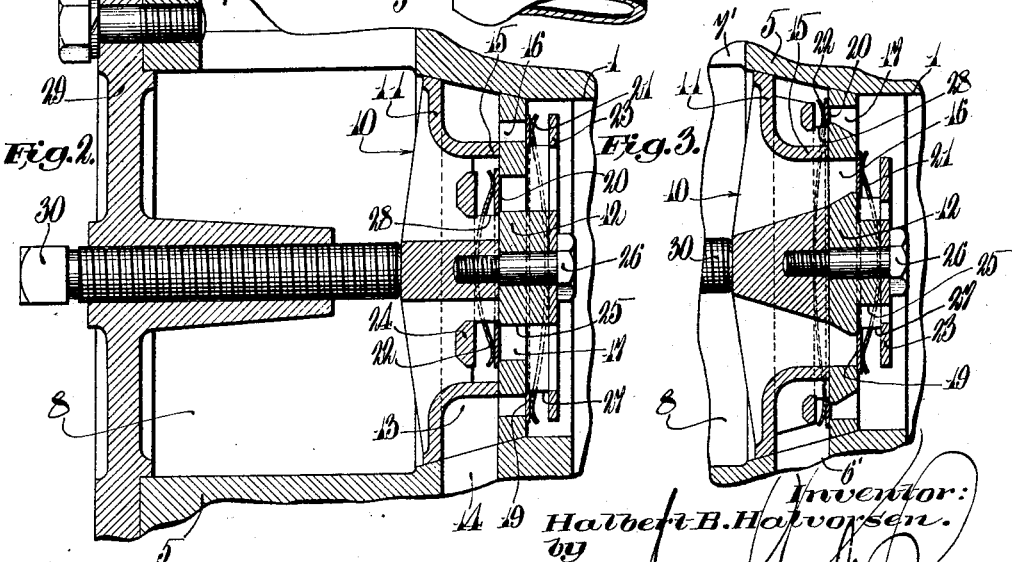
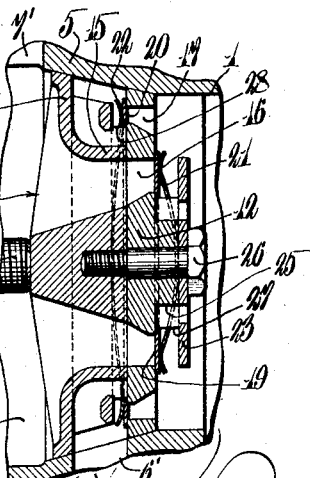
Inventor:
Halbert B. Halvorsen.
by
Attorney.

Patented Feb. 21, 1928.

1,659,817

UNITED STATES PATENT OFFICE.

HALBERT B. HALVORSEN, OF CHICAGO, ILLINOIS, ASSIGNOR TO SULLIVAN MACHINERY COMPANY, A CORPORATION OF MASSACHUSETTS.

VALVE MECHANISM.

Application filed January 30, 1922. Serial No. 532,679.

My invention relates to compressors or pumps, and more particularly to improved valve mechanisms therefor.

An object of my invention is to provide an improved valve mechanism. Another object of my invention is to provide an improved combination inlet and discharge valve mechanism for a compressor or pump. A further object of my invention is to provide an improved valve mechanism for compressors or pumps having coaxially arranged inlet and discharge valves. Other objects and advantages of my invention will hereinafter more fully appear.

In the accompanying drawings, I have shown for purposes of illustration two forms which my invention may assume in practice.

In these drawings,—

Fig. 1 is a view partially in elevation and partially in central vertical section through a compressor cylinder provided with one of the illustrative forms of my improved valve mechanism.

Fig. 2 is a central section on an enlarged scale through one of the illustrative forms of my improved valve mechanism.

Fig. 3 is a fragmentary similar view showing a different form.

For purposes of illustration I have shown my improved valve mechanism used in connection with a compressor having a cylinder 1 in which a piston 2 is reciprocable and having inlet and discharge chambers 3 and 4, respectively. The cylinder is provided with heads 5 having inlet chambers 6 communicating with the cylinder inlet chamber 3 and discharge chambers 7 communicating with the cylinder discharge passage 4. The head is also provided with valve cage receiving chambers 8 in which the illustrative forms of my improved valve mechanisms are arranged, these cage receiving chambers communicating with the inlet and discharge chambers of the head, as will hereinafter more fully appear. It will be obvious that, if desired, my improved valve mechanisms could be used in conjunction with cage receiving chambers formed in the peripheral walls of the cylinder, however, instead of as illustrated.

My improved valve mechanism, as shown in the illustrative embodiment of Figs. 1 and 2 comprises a compound cage member generally indicated by 10 and consisting of two main parts, respectively designated 11 and 12 and herein tapered and seated on a corresponding seat in the chamber 8. Intermediate these members is an external annular passage 13 which communicates by way of ports 14 with the inlet chamber 6. The open outer end of the member 11 communicates with the discharge chambers 7. The member 11 is provided with an annular rim-like portion 15 which serves to separate the chamber 13 from communication with the discharge chamber 7, and the member 12 abuts against the portion 15 of the member 11. The member 12 is traversed by concentric annular series of slots 16 and 17 which constitute respectively inlet and discharge slots and the surfaces of the member 12 surrounding the slots 16 on the side adjacent the cylinder bore and surrounding slots 17 on the side remote from the cylinder bore are machined to form seating surfaces for valve elements 19 and 20. These valve elements are annular in form and are preferably but not necessarily of thin sheet metal, the inlet valve element being designated 19 and the discharge valve element being designated 20. Cooperating with springs 21 and 22, later described, in maintaining the valves seated are guard members 23 and 24, the member 23 being adapted to be seated upon a hub portion 25 on the member 12 and the member 24 being formed integral with the member 11 to which it is secured by webs. The members 23, 12 and 11 are held in assembled relation by a single machine screw 26. Transversely bowed springs 21, 22, above mentioned, which were annular in form prior to their bowing and which have upturned ends, are disposed between the valves 19 and 20 and the guards 23 and 24 respectively. Suitable guiding ribs as shown at 27 and 28 are formed on the members 12 and 11 to guide the valves and springs during movement.

From the foregoing description, it will be evident that upon the suction stroke of the piston 2 the valves 19 will unseat, tending to flatten the springs, and that upon the opposite movement of the piston 2 the valves 19 will close while the valves 20 will be forced open, compressing and flattening their respective springs. It will be evident that my improved valve mechanism will serve to reduce the clearance volume of a compressor or pump cylinder to a minimum and that adequate flow area is readily secured thereby.

In this form of my invention as well as in the form I shall next describe, the chambers 8 are closed at their outer ends by cover plates 29, and adjustable screws 30 supported in these plates enable the securing of the members 10 in proper tight engagement with the tapering seats provided therefor.

In the illustrative form of my invention shown in Fig. 3 it will be noted that the inlet ports are arranged toward the axis of the valve cage and that the discharge ports are arranged to the outside thereof and that the functions of intake and discharge chambers 6 and 7 are accordingly reversed, the chamber 7' being intake and 6' discharge. In this form of my improved mechanism, however, it will be evident that the mode of operation is the same and that the same advantages are to be obtained therefrom.

While I have in this application specifically described two forms which my invention may assume in practice, it will be understood that these forms are shown for purposes of illustration and that the invention may be modified and embodied in various other forms without departing from its spirit or the scope of the appended claims.

What I claim as new and desire to secure by Letters Patent is:

1. In a pump, a combined inlet and discharge valve mechanism insertable and removable as a unit from said pump and including a member having coaxially arranged passages and ports with valve seats on opposite sides thereof, the axes of said passages extending substantially parallel to each other and in a single direction and so disposed as to be cut substantially throughout their lengths by common planes perpendicular to the axes of valve movement, and inlet and discharge valves for covering said ports.

2. In a valve, a combined inlet and discharge valve mechanism adapted to be inserted and removed as a unit from a suitable valve chamber and comprising a member having concentrically arranged inlet and discharge ports, valves for controlling said ports disposed on opposite sides of said member, a member providing a guard for one of said valves, said guard providing member and ported member having tapered seating surfaces adapted simultaneously to engage cooperating seat surfaces.

3. In a valve, a combined inlet and discharge valve mechanism adapted to be inserted and removed as a unit from a suitable valve chamber and comprising a member having concentrically arranged inlet and discharge ports, valves for controlling said ports disposed on opposite sides of said member, partition means spaced from one of said ports, said partition means and ported member having tapered seating surfaces adapted to engage cooperating seats in the valve chamber.

4. In a valve mechanism for pumps, a combined inlet and discharge valve including a cage inserted in operative relation to a compressor cylinder by movement in a direction perpendicular to the plane of the valves carried by said cage, and inlet and discharge valves having opposite directions of opening movement associated with said cage and insertable and removable therewith, said cage providing port means therein common to both of said valves.

5. In a pump, a pump cylinder having a bore in which a piston is reciprocable, and a combined inlet and discharge passage communicating with said bore and having inlet and discharge valves each of less diameter than said bore controlling the flow of fluid through said passage, said discharge valve being of less diameter than said inlet valve and communicating with said passage through a passage surrounded by said inlet valve and said valves having opposite directions of opening movement.

6. In a valve mechanism for pumps, an inlet passage, a valve cooperating therewith, a coaxially arranged discharge passage, a discharge valve cooperating therewith lying when closed in a plane parallel to said inlet valve and having an opposite direction of opening movement, and a common cage having a common passage which communicates with said valves supporting said valves and permitting their simultaneous insertion and removal.

7. In a pump, a cylinder having supply and discharge spaces, a port communicating with said cylinder, a valve cage communicating with said port and having separate lateral and longitudinal connections respectively communicating with the supply and discharge spaces of said cylinder, and valves controlling communication between said connections and said cylinder and removable with said cage in assembled relation thereto, said valves having opposite directions of opening movement.

8. In a pump valve mechanism, a valve cage providing parallel seats, guard means parallel to said seats, valves cooperating with said seats and having opposite directions of opening movement, and guiding means for said valves ported to permit the flow of fluid therethrough, the ports through one of said guiding means permitting flow relative to both of said valves.

9. In a pump valve mechanism, a valve cage providing parallel seats, guard means parallel to said seats, valves cooperating with said seats and having opposite directions of opening movement, and guiding means for said valves including in the case of one of said valves means providing passages for conducting fluid to the other of said valves.

In testimony whereof I affix my signature.

HALBERT B. HALVORSEN.